(12) United States Patent
Shariff et al.

(10) Patent No.: US 11,099,584 B2
(45) Date of Patent: Aug. 24, 2021

(54) METHOD AND APPARATUS FOR STABILIZING GAS/LIQUID FLOW IN A VERTICAL CONDUIT

(71) Applicant: Saudi Arabian Oil Company, Dhahran (SA)

(72) Inventors: Maher Maqbool Shariff, Dhahran (SA); Regis Didier Alain Vilagines, Dhahran (SA); Olanrewaju Malcolm Oshinowo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 213 days.

(21) Appl. No.: 15/469,906

(22) Filed: Mar. 27, 2017

(65) Prior Publication Data

US 2018/0275686 A1 Sep. 27, 2018

(51) Int. Cl.
| | | |
|---|---|---|
| G05D 7/01 | (2006.01) | |
| E21B 43/12 | (2006.01) | |
| E02B 13/00 | (2006.01) | |
| E02B 3/02 | (2006.01) | |

(52) U.S. Cl.
CPC .............. *G05D 7/01* (2013.01); *E02B 3/02* (2013.01); *E02B 13/00* (2013.01); *E21B 43/121* (2013.01)

(58) Field of Classification Search
CPC ............. G01F 1/44; E21B 43/12; E21B 47/00
See application file for complete search history.

(56) References Cited

U.S. PATENT DOCUMENTS

| | | | |
|---|---|---|---|
| 2,482,362 A | | 9/1949 | Park |
| 3,143,401 A | | 8/1964 | Lambrecht |
| 3,279,155 A | | 10/1966 | Lambert |
| 4,509,371 A | | 4/1985 | Wellman |
| 4,800,752 A | * | 1/1989 | Piers ................... E21B 47/10 |
| | | | 73/152.36 |
| 4,812,049 A | | 3/1989 | McCall |
| 4,928,758 A | * | 5/1990 | Siegfried, II ........ E21B 47/10 |
| | | | 166/250.01 |
| 5,707,214 A | | 1/1998 | Schmidt |
| 7,500,405 B2 | | 3/2009 | McCall et al. |
| 7,614,614 B2 | | 11/2009 | Sabadicci et al. |
| 7,992,453 B1 | | 8/2011 | Lawrence |

(Continued)

FOREIGN PATENT DOCUMENTS

| | | |
|---|---|---|
| CN | 201671603 | 12/2010 |
| CN | 202391402 | 8/2012 |

(Continued)

OTHER PUBLICATIONS

Ong, J. T., Aymond, M., Albarado, T. L., Majid, J., Daniels, P., Jordy, D., & Lafleur, L. F. (Jan. 1, 2007). Inverted Venturi: Optimising Recovery Through Flow Measurement. Society of Petroleum Engineers. doi:10.2118/110319-MS (Year: 2007).*

*Primary Examiner* — Blake E Michener
*Assistant Examiner* — Theodore N Yao
(74) *Attorney, Agent, or Firm* — Abelman, Frayne & Schwab

(57) ABSTRACT

A method and apparatus for stabilizing gas/liquid flow in a vertical conduit by utilizing one or more flow stabilizing devices positioned inside the conduit along a structural support tube. The flow stabilizing devices are configured and dimensioned to accelerate the velocity of the flowing two-phase fluid mixture in the conduit to sustain upward liquid flow.

16 Claims, 11 Drawing Sheets

(56) References Cited

U.S. PATENT DOCUMENTS

| | | | |
|---|---|---|---|
| 8,257,458 B2 | 9/2012 | Betting et al. | |
| 8,475,555 B2 | 7/2013 | Betting et al. | |
| 9,062,538 B2 | 6/2015 | Arellano et al. | |
| 9,151,141 B1 | 10/2015 | Ippolito | |
| 9,211,547 B2 | 12/2015 | Latta et al. | |
| 9,249,653 B1 | 2/2016 | Botts | |
| 9,574,438 B2* | 2/2017 | Flores | E21B 47/10 |
| 2002/0121371 A1* | 9/2002 | Moake | E21B 43/12 |
| | | | 166/250.07 |
| 2007/0114042 A1* | 5/2007 | Heinonen | E21B 17/02 |
| | | | 166/382 |
| 2008/0178686 A1* | 7/2008 | Jones | G01F 1/44 |
| | | | 73/861.63 |
| 2009/0145608 A1 | 6/2009 | Croteau | |
| 2011/0083839 A1* | 4/2011 | McCoy | E21B 43/128 |
| | | | 166/68.5 |
| 2011/0146995 A1* | 6/2011 | Lewis | E21B 43/26 |
| | | | 166/308.1 |
| 2011/0185805 A1* | 8/2011 | Roux | E21B 47/10 |
| | | | 73/152.29 |
| 2011/0259119 A1 | 10/2011 | Steven | |
| 2011/0277999 A1* | 11/2011 | Corre | E21B 36/04 |
| | | | 166/264 |
| 2011/0297391 A1 | 12/2011 | Fielder et al. | |
| 2012/0227585 A1 | 9/2012 | Akdim et al. | |
| 2013/0092373 A1 | 4/2013 | Arellano et al. | |
| 2013/0140872 A1* | 6/2013 | Jeffrey | E21B 33/127 |
| | | | 299/16 |
| 2013/0341033 A1 | 12/2013 | Carstensen et al. | |
| 2014/0377080 A1 | 12/2014 | Xiao et al. | |
| 2015/0027693 A1 | 1/2015 | Edwards et al. | |
| 2015/0053410 A1* | 2/2015 | Arellano | E21B 43/38 |
| | | | 166/309 |
| 2015/0292317 A1* | 10/2015 | Flores | E21B 47/10 |
| | | | 166/250.01 |

FOREIGN PATENT DOCUMENTS

| | | |
|---|---|---|
| CN | 102839948 A | 12/2012 |
| CN | 104314517 | 1/2015 |
| CN | 105089607 A | 11/2015 |
| CN | 105115550 | 12/2015 |
| GB | 2422159 | 7/2006 |
| IN | 40/2013 | 4/2013 |
| WO | 2015/134949 | 9/2015 |

* cited by examiner

FIG. 1
FIG. 2
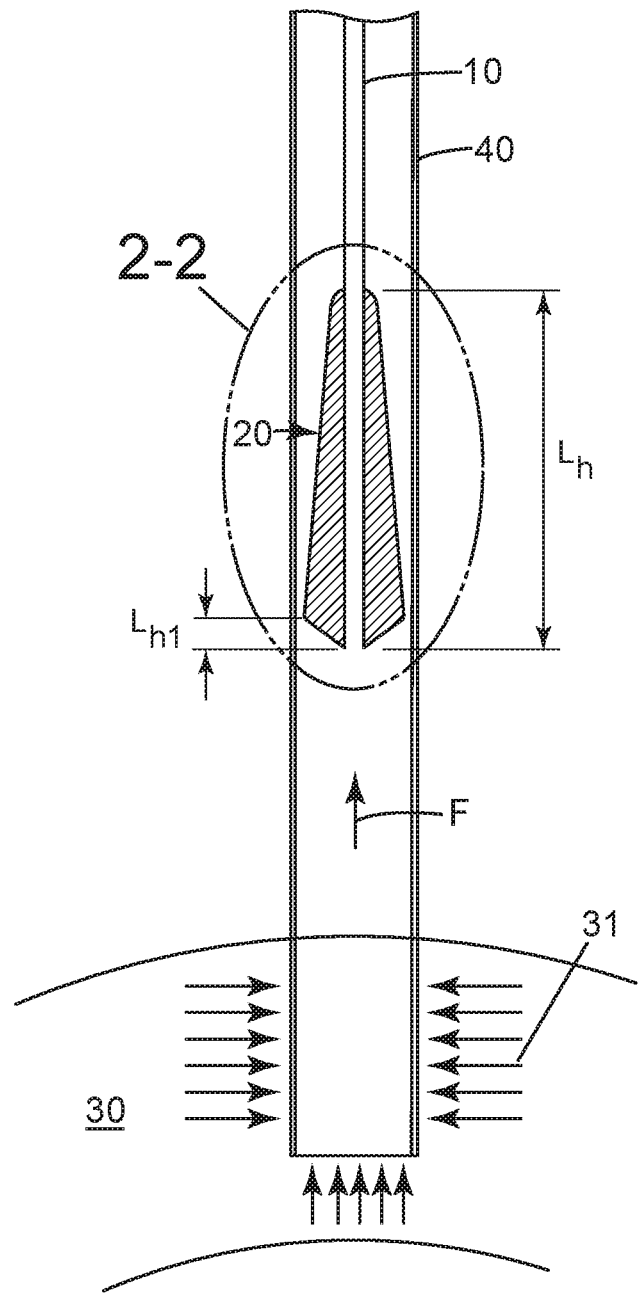
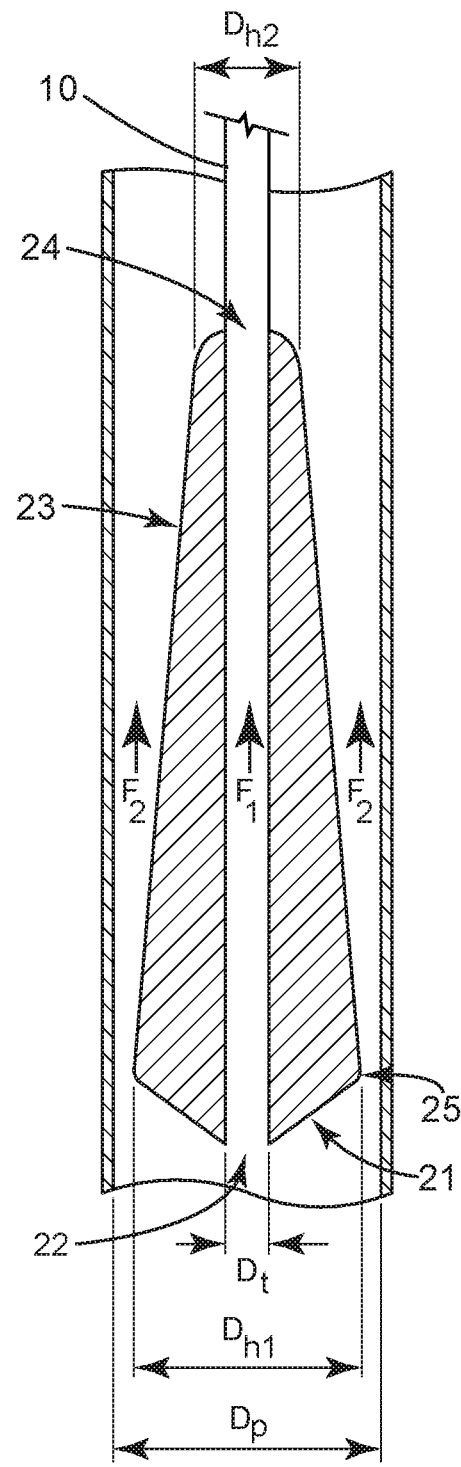

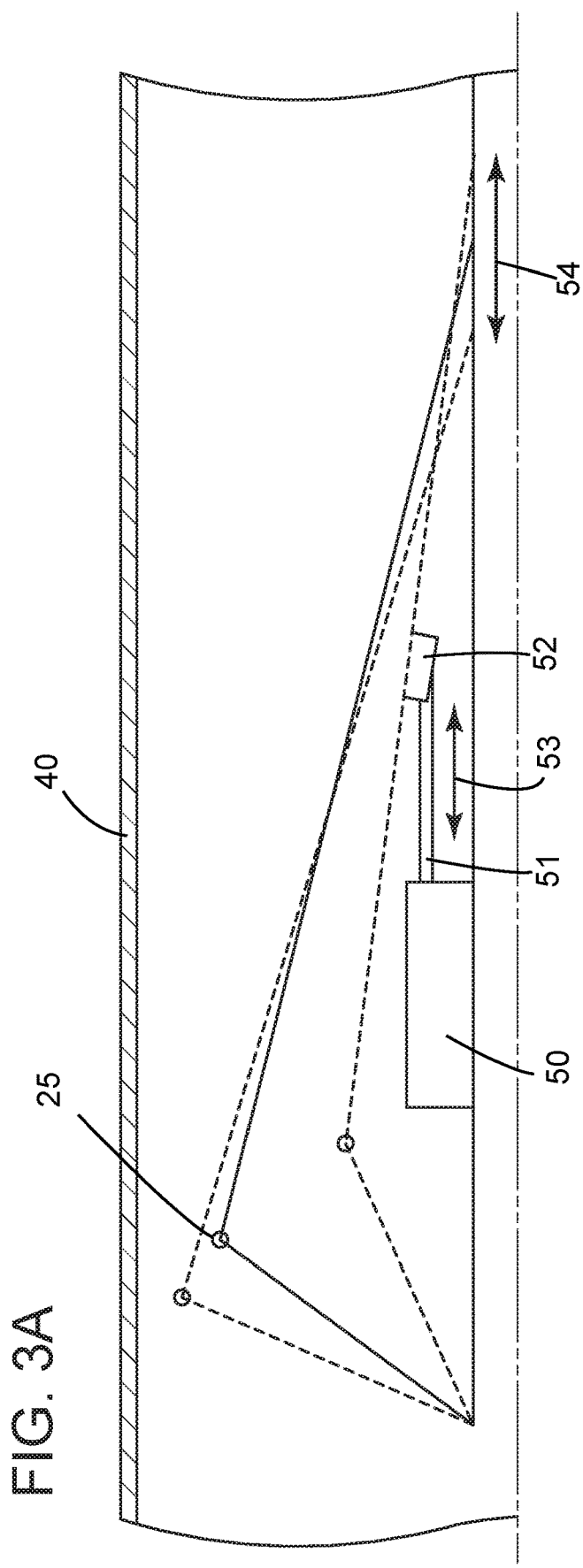

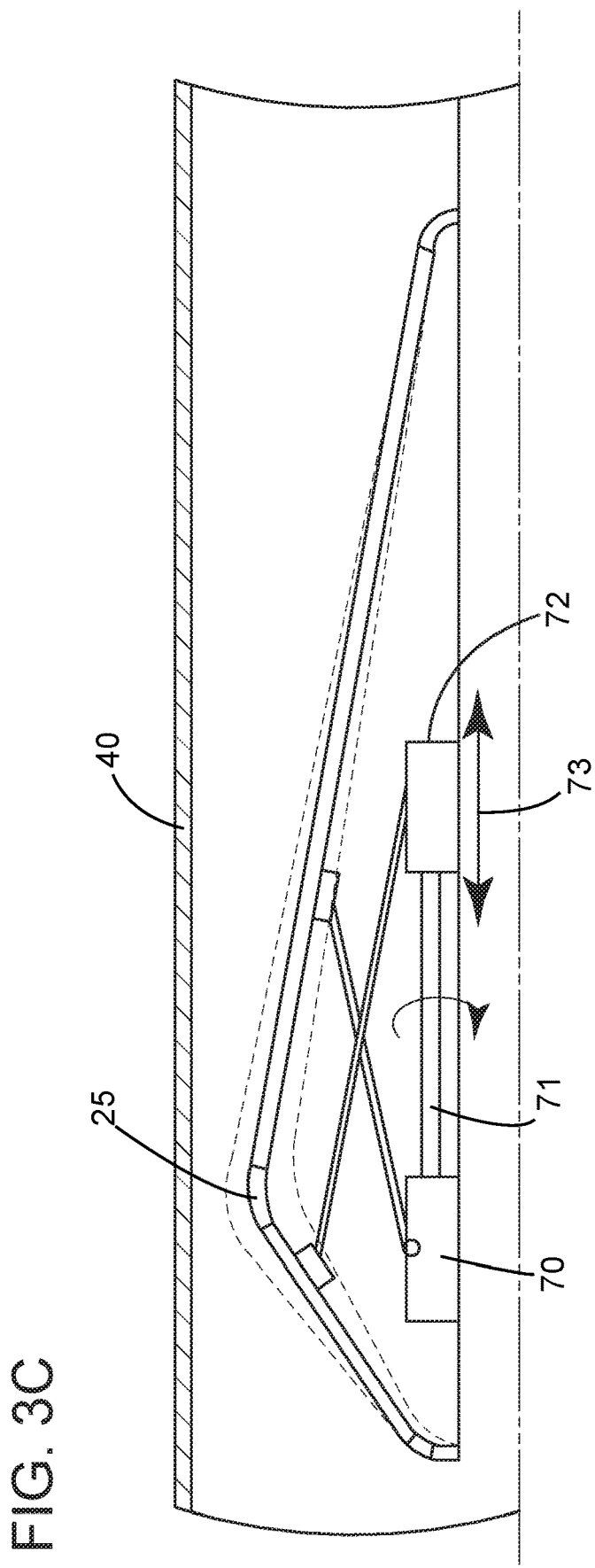

FIG. 5A
FIG. 5B
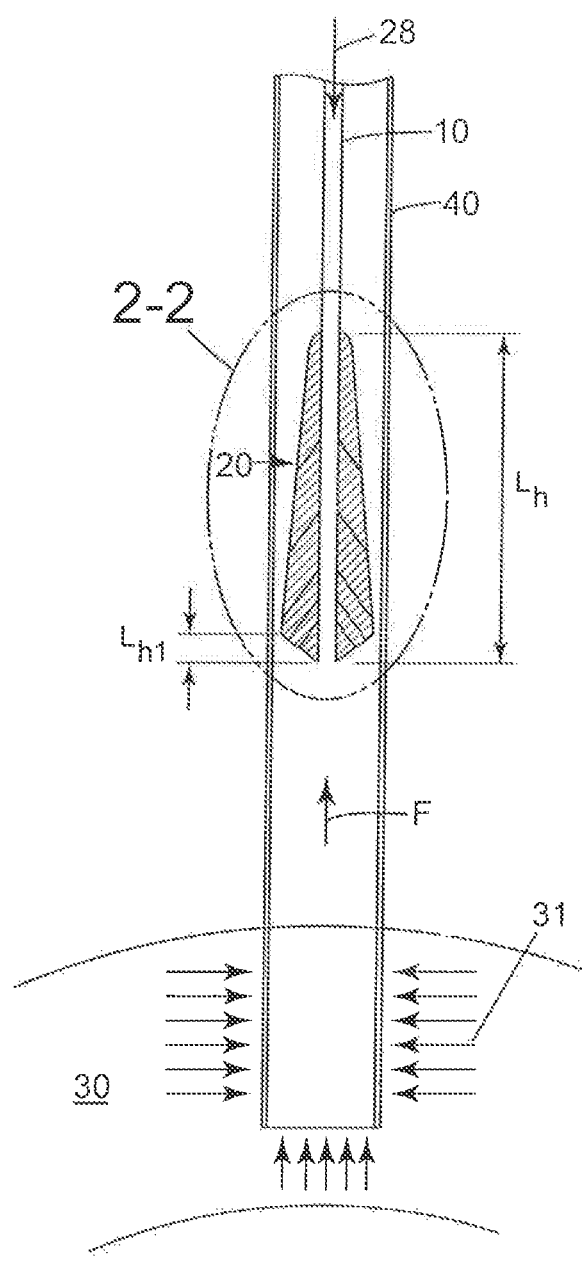
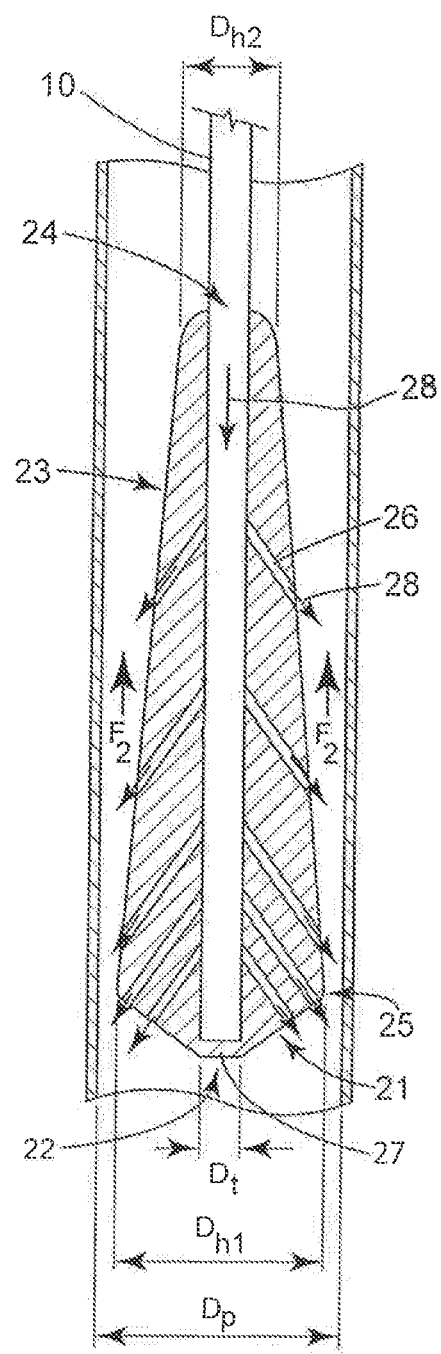

FIG. 9A
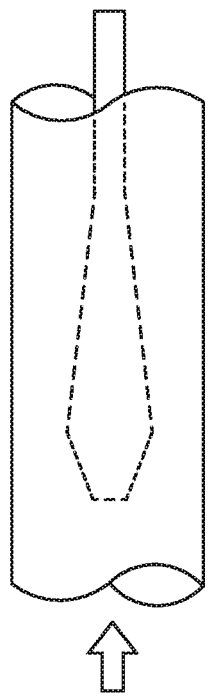
FIG. 9B
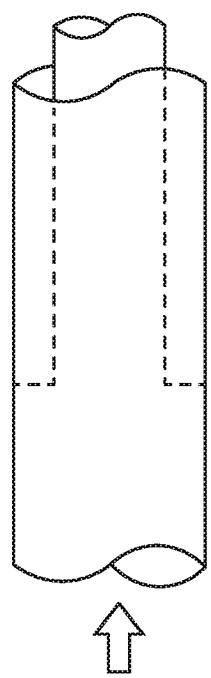
FIG. 9C
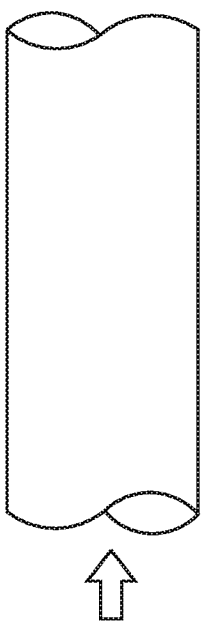
FIG. 10
|  | FSD (coil Tubing) | Velocity String (coil Tubing) | Open Tubular |
|---|---|---|---|
| Tubing Size, in | 4 1/2 | 4 1/2 | 4 1/2 |
| Tube ID, in | 3.92 | 3.92 | 3.92 |
| Coil Tubing Size, in | 1 | 2.75 | n/a |
| Coil Tubing ID, in | 0.826 | 1.89 | n/a |
| Flow Area, in2 | 11.283 | 2.782 | 12.069 |

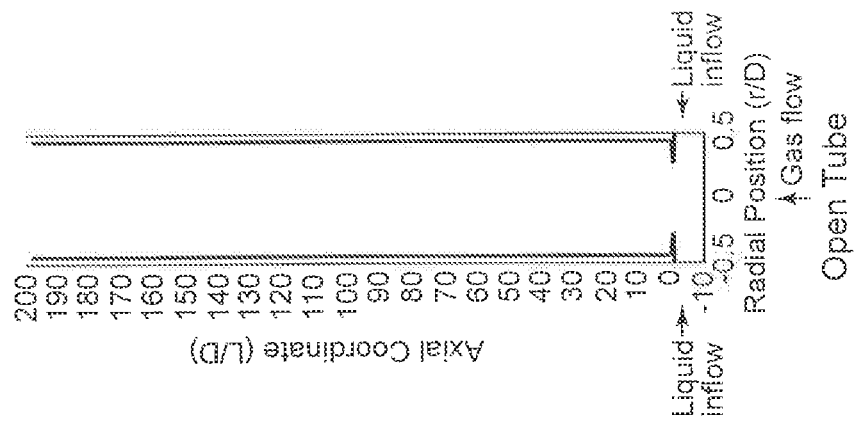
FIG. 11A  FSD
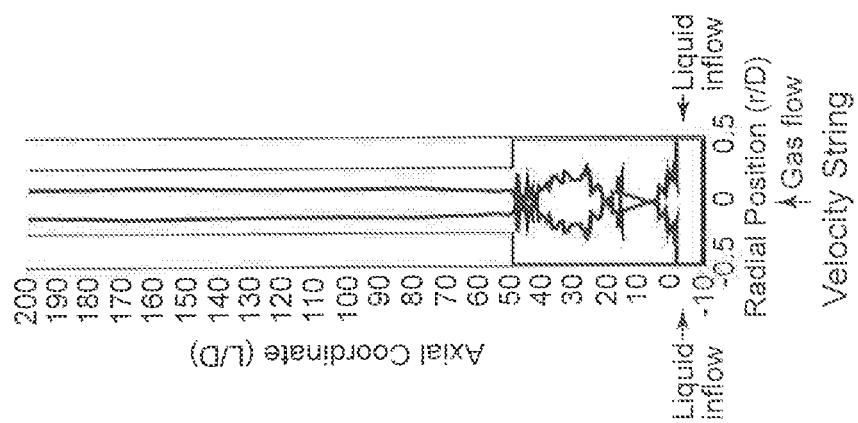
FIG. 11B  Velocity String
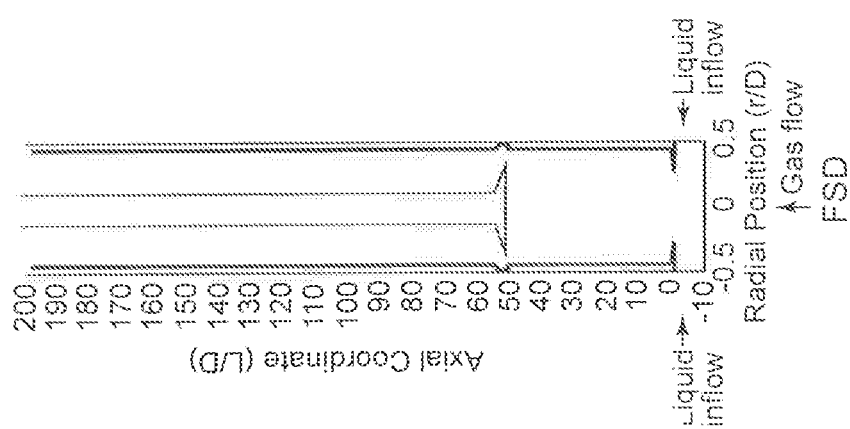
FIG. 11C  Open Tube

| | Units | FSD | Velocity String | Open Tubular |
|---|---|---|---|---|
| Gas Velocity | m/s | 18.7 | 4.6 | 20 |
| String Gas Velocity | m/s | n/a | 20 | n/a |
| Annulus Gas Velocity | m/s | 20 | n/a | n/a |
| Mixture Density | kg/m³ | 6.5 | 22.4 | 6.2 |
| Loss Coefficient ($\Delta P/\frac{1}{2}\rho\upsilon^2$) | - | 3.0 | 7.2 | n/a |
| Discharge Coefficient C | - | 0.96 | 0.62 | n/a |
| Relative Gas Production rate | - | 93.5% | 23% | 100% |

METHOD AND APPARATUS FOR STABILIZING GAS/LIQUID FLOW IN A VERTICAL CONDUIT

RELATED APPLICATIONS

Not applicable

BACKGROUND OF THE INVENTION

Field of the Invention

This invention relates to a method and apparatus for stabilizing gas/liquid flow in a vertical conduit.

Description of Related Art

A growing number of gas wells are challenged with liquid loading issues. These wells are kept shut-in or suspended when condensate/formation liquids cannot be lifted with the declining reservoir pressure and production tubing. Gas well life is typically about 20 years. Over that period reservoir pressure declines from original reservoir pressure (around 7,500 for Khuff and 8,500 psi for pre-Khuff reservoirs) down to 3,000 psi or lower. Once reservoir pressures decline to around 3,000 psi or lower, the wells can no longer be produced against current flowline pressures without additional compression in addition to the increase in liquid influx and must be shut-in leaving valuable hydrocarbon in place.

The Oil & Gas production industry includes hundreds of gas production wells with many having known production problems attributed to the liquid loading phenomenon. It is estimated that the number of problematic wells will substantially increase in the coming few years. Most gas wells drilled in the 1990's and early 2000's used a standardized approach resulting in a standard well completion with either 4½ inch or 5½ inch diameter production tubing.

Liquid loading of gas wells is a subject of high importance. Mitigating liquid loading translates to considerable improvement in the production of an aging gas well. In gas wells, natural gas, condensate and water are produced concurrently.

In the early stages of well life, the gas flow rate is high enough to lift liquid condensate all the way up to the ground level. Under these conditions, the flow regime is annular with gas flowing continuously in the core of the pipe and the liquid as entrained droplets flowing in the core surrounded by a liquid film on the wall.

As the gas well matures, the produced gas flow rate and pressure decrease, reducing liquid lifting capability and initiating what is known as liquid loading. Liquid begins accumulating downhole and the flow pattern changes from annular to an intermittent and unsteady churning flow regime. The accumulated liquid hinders hydrocarbon production.

Currently, the most common conventional method for re-energizing a produced fluid flow upward in a producing well is by increasing the flow rate in the existing production tubing by injecting a gas at high pressure at the appropriate height in the well. This technique is broadly named as "artificial lift" and is widely used to draw gas from wells with decreasing flowing pressure. Other conventional methods for pumping low pressure wells in the Oil & Gas production industry include the use of a down-hole plunger or rod-type pump and the injection of chemicals to change the properties (density and viscosity) of the liquid phase and facilitate the gas production.

Alternatively, a commercial solution for re-energizing gas wells that are choking due to liquid loading available to the gas production industry is the so-called "velocity string" (Schlumberger). The velocity string is simply a production tubing with smaller diameter that the initial well tubing which is installed in the well during a work over procedure to extend from the well bottom in the "pay zone" all the way up to the well head. Once the velocity string is installed, the annular space between the well tubing and the outside walls of the velocity string is shut and the well production is flowed through the velocity string. The production flow being produced through a smaller diameter tubing, the gas flowing speed is increased and the liquid can be entrained upwards the well, thus eliminating the liquid loading problem.

More specifically, one current technique for mitigating liquid loading issues in gas wells is through the insertion of coiled tubing inside the 4½ inch or 5½ inch production tubing. This coiled tubing is also known as the "velocity string". This technique helps lift the gas at the cost of a very low production rate, typically 0.5 to 9 MMSCFD, as compared with the production rates for production size tubing. The 4½ inch production liner produces 3.5 to 35 MMSCFD; the 5½ inch production liner produces 5 to 45 MMSCFD under the same reservoir pressures (see FIG. 10).

Engineers in the Oil & Gas production industry use the well performance, design and optimization software PROSPER (Petroleum Experts Inc.) to model well configurations. Engineers use PROSPER to predict tubing and pipeline hydraulics for different well designs. FIG. 10 shows production flow rates from a typical gas well with 5½ inch tubing, 4½ inch tubing, and velocity string of 2⅞ inch coil tubing diameters.

Known attempts for mitigating liquid loading issues in gas wells have room for improvement.

SUMMARY OF THE INVENTION

The present invention provides a method and apparatus for stabilizing gas/liquid flow in a vertical conduit.

In one embodiment, a vertical production tubing for conveying a flowing two-phase fluid mixture, comprising of gas-liquid fluids, is provided. The tubing has an inner surface and upstream and downstream ends. The tubing includes one or more flow stabilizing devices positioned in the tubing along a structural support tube. The one or more flow stabilizing devices are configured and dimensioned to accelerate the velocity of the flowing two-phase fluid mixture in the tubing to sustain upward liquid flow. The at least one of the one or more flow stabilizing devices includes: a first portion facing upstream, wherein the distal end of the first portion forms a first apex that faces upstream; a second portion facing downstream, wherein the distal end of the second portion form a second apex that faces downstream; a passageway extending from the first apex through the second apex. The structural support tube is attached directly to the second apex and extends axially from the second apex, wherein the structural support tube is disposed entirely within the tube. Each of the flow stabilizing devices is dimensioned and configured so that the exterior surface of the flow stabilizing device does not touch the adjacent inner wall of the tubing, wherein the exterior surface of the first portion forms a solid surface that is configured to block and deflect the path of the flowing two-phase fluid mixture; wherein a first portion of the mixture flows through the passageway; and wherein a second portion of the mixture flows around the flow stabilizing device.

In one embodiment, a flow stabilizing device positioned in a vertical production tubing to sustain upward liquid flow is provided. The flow stabilizing device comprising: a first portion facing upstream, wherein the distal end of the first portion forms a first apex that faces upstream; a second portion facing downstream, wherein the distal end of the second portion form a second apex that faces downstream; a passageway extending from the first apex through the second apex. The structural support tube is attached directly to the second apex and extending axially from the second apex, wherein the structural support tube is disposed entirely within the tube; and wherein each of the flow stabilizing devices is dimensioned and configured so that the exterior surface of the flow stabilizing device does not touch the adjacent inner wall of the tubing, wherein the exterior surface of the first portion forms a solid surface that is configured to block and deflect the path of the flowing two-phase fluid mixture; wherein a first portion of the mixture flows through the passageway; and wherein a second portion of the mixture flows around the flow stabilizing device.

In one embodiment, a method of accelerating the velocity of a gas/liquid flow in a vertical production tubing is provided, wherein the tubing having an inner surface. The method comprising: providing a flow stabilizing device positioned centrally in the tubing along a structural support tube, wherein the structural support tube is disposed entirely within the tubing; the flow stabilizing device including a central passageway configured and dimensioned to receive a portion of the gas/liquid flow and wherein a portion of the gas/liquid flow is directed around the flow stabilizing device; wherein the flow stabilizing device is dimensioned and configured so that the exterior surface of the flow stabilizing device does not touch the adjacent inner wall of the tubing.

The method according to the invention makes use of a dual-cone flow stabilizing device to prevent liquid film reversal on the walls of a gas producing well. The device according to the invention acts to locally modify the gas phase velocity in the well so that the liquid film formed at the walls is kept stable and reverse liquid flow is avoided. The method also allows some pressure control in a portion of the well production flow to optimize the efficiency of the flow stabilizing device. The flow stabilizing device can be installed in aging gas producing wells using the standard well workover or intervention procedures.

Although the present invention primarily targets wells with the 4½ inch and 5½ inch diameter production tubing, the present invention can also work for larger diameter production wells.

Good candidates for installing the flow stabilizing devices according to the present invention are gas wells of Khuff and Pre-Khuff reservoir formations. These gas wells are 12,000 to 17,000 feet deep. The reservoir pressures range from 3,500 to 9,000 psi and the temperature varies from 250 to 350 deg F.

The method according to the present invention utilizes procedures for installing downhole equipment either on coiled tubing or utilizing a workover rig, depending on the operational capabilities of each unit. The installation configuration must be safe, cost-optimal, reproducible and reliable.

The present invention extends the life of a producing well by promoting a steady flow regime and transport of the gas and liquid phases; therefore, stabilizing the flow.

The technical solution of the present invention is to sustain a desired two-phase annular flow regime to transport liquid and gas upward inside the well by incorporating one or more flow stabilizing devices. Thanks to its converging-diverging geometry, the flow stabilizing device increases the gas phase velocity while keeping the liquid phase transported as a film on the inner wall of the well. This avoids the liquid loading problem in the gas production well, thus extending its life, increasing its cumulative gas production and recovering the liquid condensate. The flow stabilizing device configuration can be designed for the purpose of accelerating the flow at critical locations in the well where additional momentum is needed to sustain the upward liquid film flow. During the life of the production well, the flow stabilizing device configuration can be upgraded by sliding additional cone inserts down the supporting center tube and locking the flow stabilizing device units at the selected depths in the well.

BRIEF DESCRIPTION OF THE DRAWINGS

The invention will be described in further detail below and with reference to the attached drawings in which the same or similar elements are referred to by the same reference numerals, and in which:

FIG. 1 is a longitudinal cross-sectional view of a vertical well tubing inside which a flow stabilizing device of the present invention is positioned;

FIG. 2 is an enlarged view of section 2-2 of FIG. 1 schematically illustrating the splitting of the ascending gas/liquid flow inside the vertical well tubing between a gas rich flow through the center of the flow stabilizing device and a gas/liquid annular flow around the flow stabilizing device, according to one embodiment of the present invention;

FIGS. 3A, 3B, and 3C illustrate alternative embodiments of internal mechanisms for adjusting the diameter of a flow stabilizing device;

FIGS. 5A and 5B illustrate an alternative embodiment wherein one or more openings are positioned in the side wall of the flow stabilizing device;

FIGS. 9A, 9B, and 9C are schematic illustrations of various geometries used in a fluid flow simulation test;

FIG. 10 is a table providing geometry data for a comparative computational fluid dynamics study conducted using the geometries illustrated in FIGS. 6A, 6B, and 6C in a 4½ inch gas producing well;

FIGS. 11A, 11B, and 11C are schematic illustrations of fluid flow simulation results using the geometries illustrated in FIGS. 6A, 6B, and 6C and showing the liquid film stabilization effect induced by the flow stabilizing device;

DETAILED DESCRIPTION OF THE INVENTION

Figure 3B:
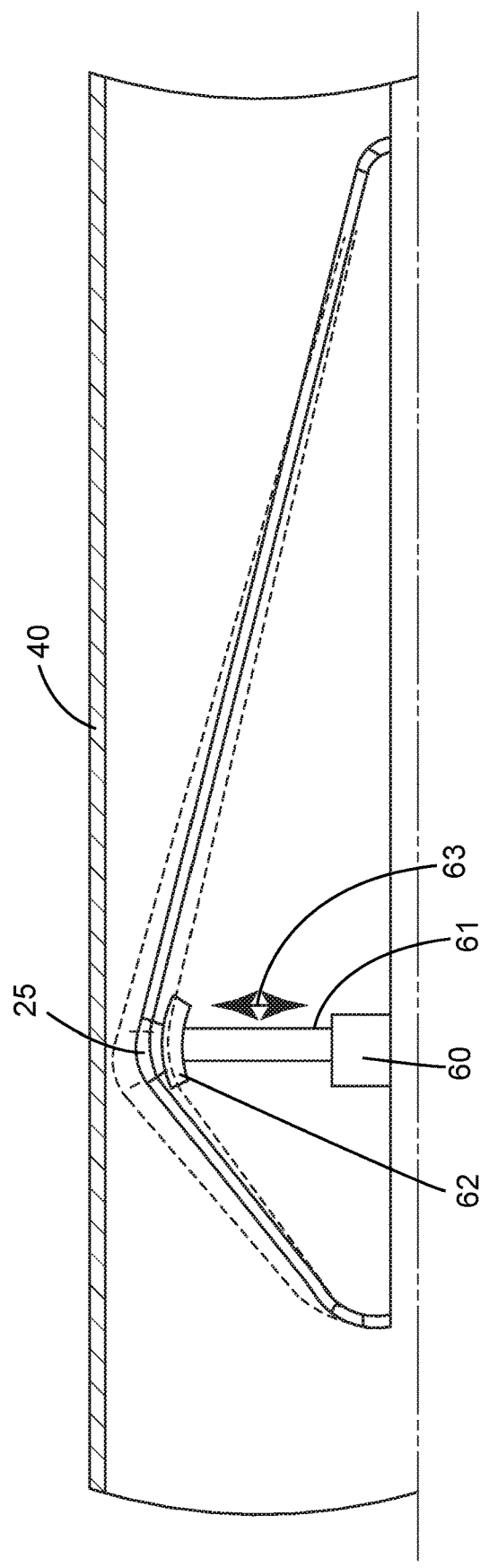

The aim of the present invention is to produce or sustain a desired two-phase annular flow regime to transport liquid and gas upward inside vertical pipes of circular cross-section by incorporating one or several flow stabilizing device configurations in the pipe. The flow stabilizing device configuration of the present invention is useful for the purpose of accelerating the flow in vertical pipes at critical locations where additional momentum is needed to sustain the upward liquid flow. The flow stabilizing device configuration can be applied in production columns, and natural gas producing wells with liquid loading problems, to enhance liquid lifting in gas wells.

FIGS. 1 and 2 illustrate a longitudinal cross-sectional view of a vertical well tubing 40 inside which a flow stabilizing device 20 of the present invention is positioned. Within the upstream end of the well tubing 40, an ascending gas/liquid flow F is present and results from tapping into a reservoir 30 that produces a gas, liquid condensate and water mixture 31. The flow stabilizing device 20 includes a first portion 21 which is positioned towards the upstream end which terminates at a first apex 22. The flow stabilizing device includes a second portion 23 which is positioned towards the downstream end which terminates at a second apex 24. The first portion 21 and second portion 23 are joined along an intersection 25. In a preferred embodiment, the first portion 21 and second portion 23 are conically-shaped, converging, respectively, to the first apex 22 and the second apex 24, forming a diverging-converging dual cone. Other shapes can also be used. A central passageway extends from the first apex 22 through the second apex 24. A structural support tube 10 is attached directly to the second apex 24. Preferably, the diameter of the central passageway and the structural support tube 10 are substantially equal.

Thanks to its converging-diverging geometry, the flow stabilizing device 20 increases the gas flow velocity, which increases momentum transfer to the liquid phase. The momentum transfer is varied by adjusting the flow acceleration ratio Γ:

where $$\Gamma = \frac{D_p^2}{D_{h_1}^2 - D_t^2} \quad (1)$$

at the flow stabilizing device throat where the cross-sectional area presented to the fluid flow is the minimum.

The flow acceleration ratio Γ should preferably be in the range:

$$1.2 \leq \Gamma \leq 5 \quad (2)$$

for the flow stabilizing device to perform stabilization of vertical gas-liquid flows. An optimum acceleration ratio Γ is dependent on the flow regime and the physical properties of the gas and liquid phases.

The flow stabilizing device diameter ratio Δ:
where $$\Delta = \frac{D_t}{D_{h_1}} \quad (3)$$

should be in the range from 0 to ⅔ for the flow stabilizing device to generate the desired blockage to the flow section area in the vertical column.

The flow stabilizing device 20 is supported and held in position inside the production column by a supporting center tube 10. The diameter $D_t$ of flow stabilizing device supporting tube 10 is preferably between:

$$0.2 \text{ inch} < D_t < 0.5 \text{ inch} \quad (4)$$

For a typical gas producing well that is completed with 4½ inch or 5½ inch diameter production tubing 40, a 1-inch diameter or larger supporting tube 10 will be preferred because it is commercially available as a standard coiled tubing, which offers a lower cost option for manufacturing and installing the flow stabilizing device 20.

The flow stabilizing device 20 is preferably fabricated from a rigid corrosion resistant material. The material can be a metal, sleeved metal or non-metallic. A pneumatic, hydraulic or electrical mechanism is used to adjust the vertical location of flow stabilizing device 20 and fix the position the flow stabilizing device at the desired height in the production column 40.

In another embodiment of the flow stabilizing device, the cross-sectional area of the annular passageway or throat is adjustable via an upward/downward sliding mechanism to change $D_{h_1}$ and thus control momentum and liquid entrainment as required by the flow conditions. For example, a motion actuator can operate via electrical, hydraulic, or pneumatic operation.

For example, FIG. 3A illustrates a motion actuator 50 that is joined to an attachment member 52 via a connector 51. The attachment member 52 is joined to an inner surface of the flow stabilizing device. The motion actuator 50 controls the movement of the attachment member 52 along the direction 53. The position of the intersection 25 can therefore be controlled by the motion actuator wherein the intersection 25 can be a hinged or flexible connection point at the intersections of two rigid arms. In this embodiment, two or more sets of rigid arms are symmetrically distributed radially along the inner surface of the flow stabilizing device to create a framework for adjusting the diameter of the flow stabilizing device.

In another embodiment of the flow stabilizing device, the outer surface of the flow stabilizing device is flexible allowing, with an internal mechanism, the adjustment of the throat gap to change $D_{h_1}$ and thus control momentum and liquid entrainment as required by the flow conditions. For example, FIG. 3B illustrates a motion actuator 60 that is joined to an attachment member 62 via a connector 61. The attachment member 62 is joined to an inner surface of the flow stabilizing device. The motion actuator 60 controls the movement of the attachment member 62 along the direction 63. The position of the intersection 25 can therefore be controlled by the motion actuator. In this embodiment, two or more sets of attachment members 63 are symmetrically distributed radially along the inner surface of the flow stabilizing device to create a framework for adjusting the diameter of the flow stabilizing device.

In another embodiment of the flow stabilizing device, FIG. 3C illustrates a motion actuator 70 that is joined to an attachment member 72 via a connector 71. The actuator 70 and the attachment member 72 are separately joined to an inner surface of the flow stabilizing device via rigid arms. The motion actuator 70 controls the movement of the attachment member 72 along the direction 73, which in turn controls the position of the rigid arms. The position of the intersection 25 can therefore be controlled by the motion actuator. In this embodiment, two or more sets of rigid arms are symmetrically distributed radially along the inner surface of the flow stabilizing device to create a framework for adjusting the diameter of the flow stabilizing device.

With reference to FIGS. 3A-3C, the diameter of the flow stabilizing device can be adjusted starting from the position illustrated in solid lines, with the alternative positions being illustrated in dashed lines in either side of the starting position. It should be understood that the various positions illustrated are exemplary only, and any alternate position can be achieved according to the configuration of the motion actuator. In another embodiment, a flexible ring can form the framework of the intersection 25, in order to maintain the generally circular cross-section of the outermost diameter of the flow stabilizing device.

Figure 4:
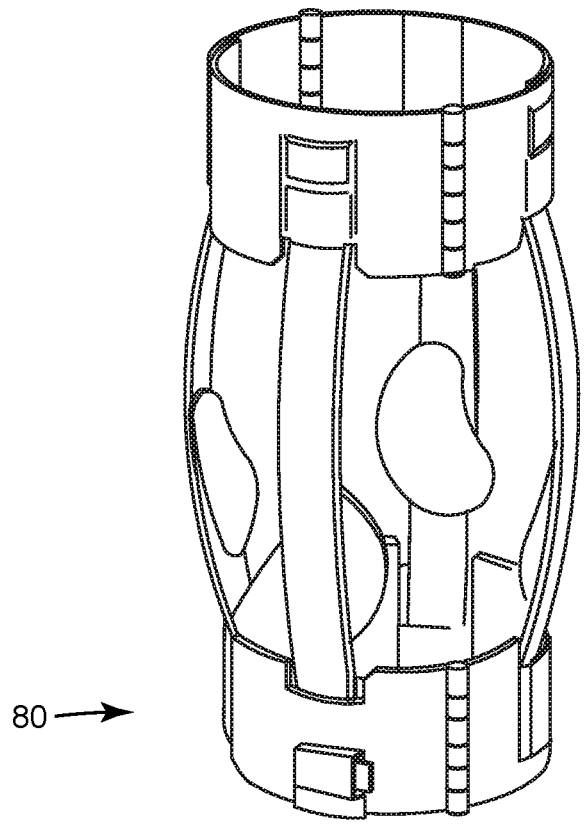
FIG. 4 illustrates a prior art non-welded spring bow centralizer for centering the flow stabilizing device.
Figure 6A:
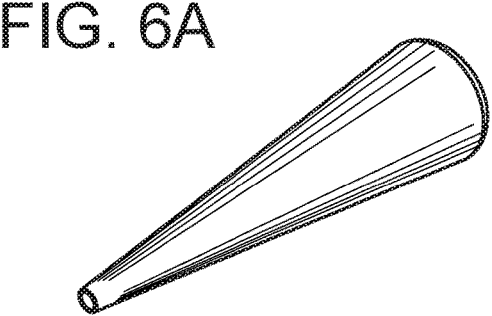
FIGS. 6A, 6B, 6C, and 6D are a series of rear perspective, side, rear, and front view, respectively, of one embodiment of a flow stabilizing device.
Figure 6B:
Figure 6C:
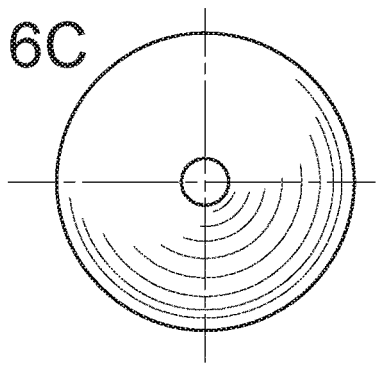
Figure 6D:
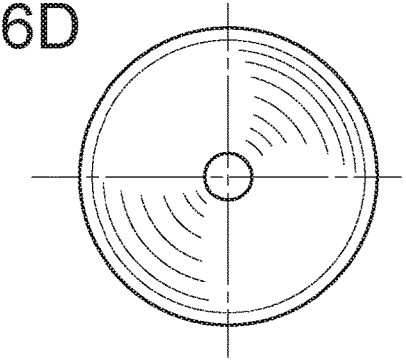

The flow stabilizing device can be centered in the production column 40 by any means such as centering mechanical device located on the flow stabilizing device supporting tube 10 or by means of ribs or centering winglets attached to some of the cone inserts forming the flow stabilizing device. For example, FIG. 4 illustrates a prior art non-welded spring bow centralizer for centering the flow stabilizing device.

In another embodiment, the flow stabilizing device 20 is used in combination with a known pressure control device (not shown) to split the ascending flow inside the column into a gas rich flow $F_1$ through a central tube at the opening formed at the first apex 22 of the flow stabilizing device with diameter $D_t$ in FIG. 2, and a gas+liquid annular flow $F_2$ around the flow stabilizing device. The pressure control device can be any prior art system capable of keeping a constant static pressure difference between the center tube and the annular flow section, at the top of the production column, or the well head. This embodiment is named the Hollow Flow Stabilizing Device or HFSD. The foreseen advantage of the HFSD is a way to optimize the production process by continuously adjusting the static pressure difference to maximize the total gas production rate.

In another embodiment, illustrated in FIGS. 5A and 5B, the flow stabilizing device is used in combination with a pressurizing system capable of injecting a gas or a liquid 28 down through the structural support tube 10 into the production column in order to help stabilize the liquid film at the wall of the production column 40. In this embodiment, the flow stabilizing device can be equipped with holes or slots 26 distributed in any part of the cone inserts or above the cone inserts in the center tube supporting them. This embodiment is referred to as the Injection Flow Stabilizing Device or IFSD. The foreseen advantage of the IFSD is the assisted flow stabilizing effect by means of pressurized gas injection (added gas lift effect resulting in enhanced liquid film stabilization at the column wall) and/or chemical additive injection (low dosage liquid film stabilization agent or viscosifier or surfactant). In this embodiment, a plug 27 is positioned at the first apex 22 of the flow stabilizing device to direct the injected gas or liquid 28 through the openings 26.

FIG. 6 shows different views of an embodiment of the flow stabilizing device.

Figure 7:
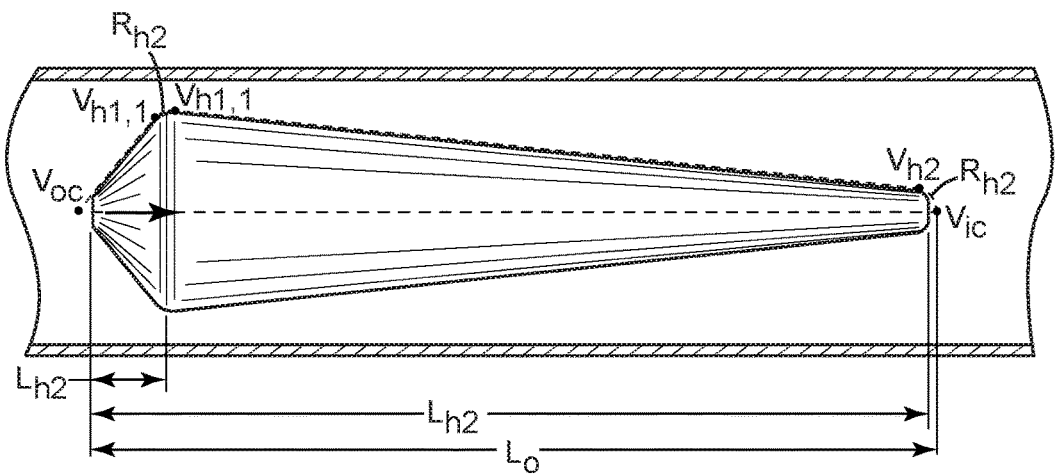
FIG. 7 is a longitudinal side view of a flow stabilizing device positioned inside a vertical well tubing and marked with references for dimensioning.

FIG. 7 is a longitudinal side view of a flow stabilizing device positioned inside a vertical well tubing and marked with references for dimensioning. The actual dimensions for the flow stabilizing device will depend on the existing tubing dimensions and will be specifically selected to accommodate the production lining. There is a wide range of tubing sizes in the oil and gas industry suited for application of the present invention. For example, standard production tubing sizes for oil and gas production range from as small as ½ inch to as large as 5¼ inches or more.

Figure 8A:
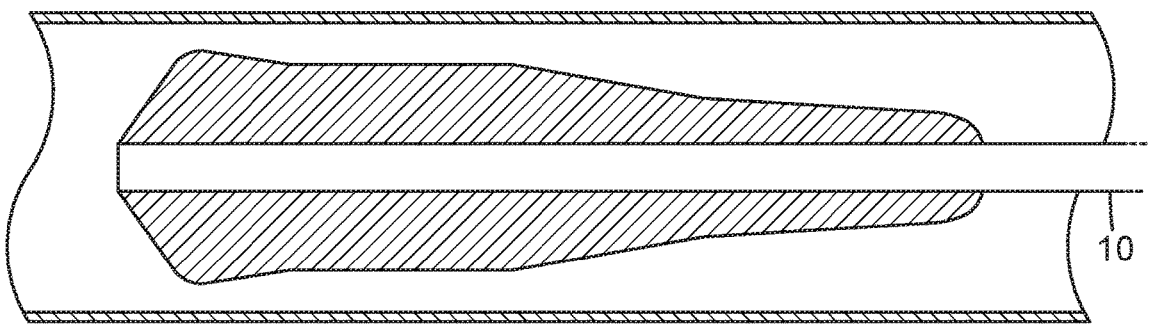
FIG. 8A is longitudinal cross-section view of another embodiment of a flow stabilizing device of the present invention.
Figure 8B:
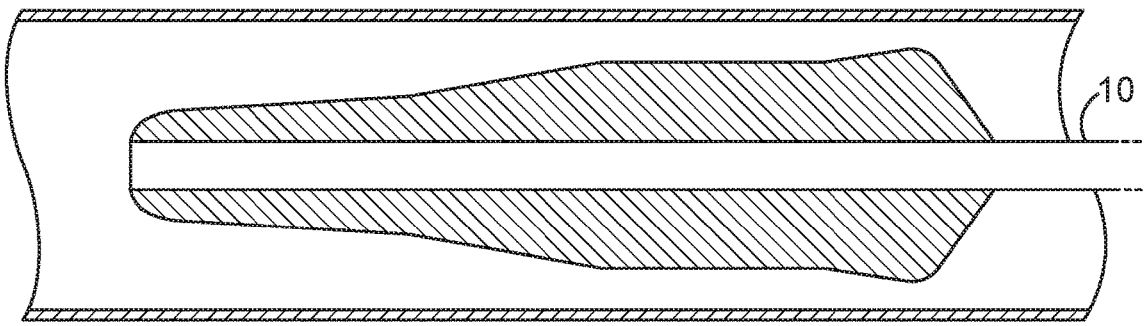
FIG. 8B is longitudinal cross-section view of another embodiment of a flow stabilizing device of the present invention.

In alternative embodiments, the flow stabilizing device is composed of more than two cone inserts arranged along their supporting center tube 10. FIGS. 8A and 8B show two non-limiting examples of such embodiments.

As shown in FIGS. 9-12, the inventors have conducted Computational Fluid Dynamics (CFD) simulation work in order to prove the effectiveness of the flow stabilizing device of the present invention and to optimize the flow stabilizing device design for the purpose of stabilizing the liquid film at the inner wall of the production column, in the range of flowrates and Gas Volume Fraction (GVF) of interest to the practical application.

In a first stage, the inventors' research work had the objective to model the annular vertical two-phase flow in an open tubular (see FIG. 9C) and the same tubular configuration equipped with a velocity string (see FIG. 9B) in order to understand the different flow structures in these geometries and establish a set of reference data points quantifying the performances of the prior art technique. According to FIG. 9B, a coiled tubing velocity string is a smaller diameter tube inserted down the production tubing to raise the production gas velocity above the critical velocity required to lift liquid and unload the gas well. Then the CFD model was then run with a "reverse-venturi" or Flow Stabilizing Device (see FIG. 9A) according to the present invention to assess its impact on the annular flow regime and compare the flow characteristics with the reference data sets. The three geometries tested with CFD are schematically illustrated by FIG. 9A (flow stabilizing device attached to support tube), 9B (velocity string), and 9C (open tubular configuration).

Figures 12, 13:
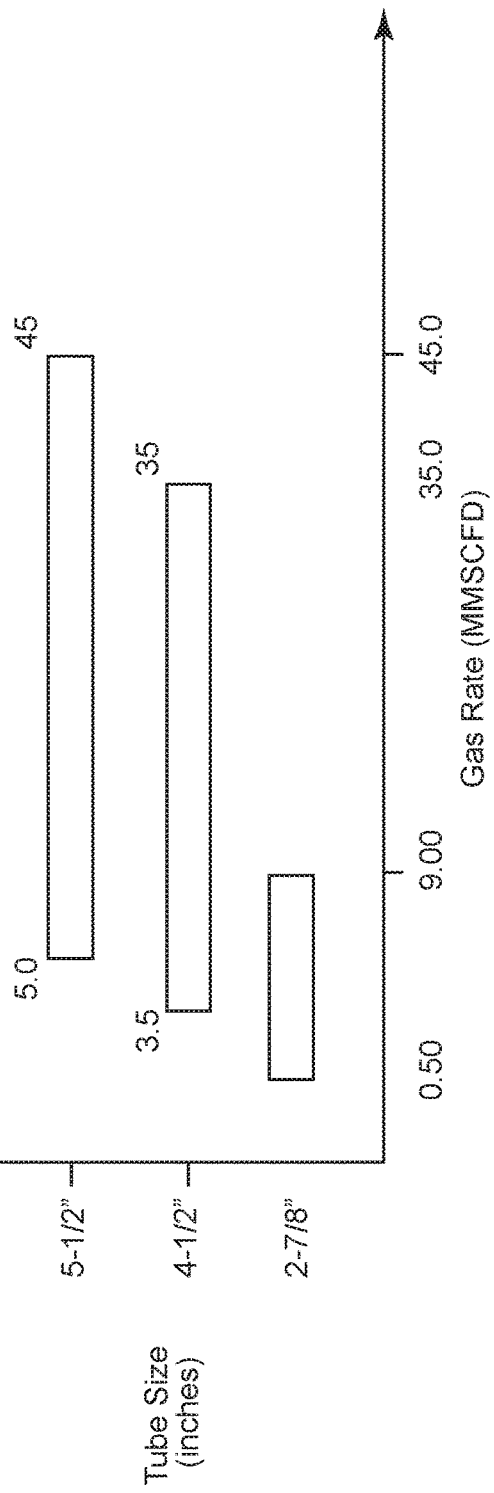
FIG. 12 is a table providing computational fluid dynamics results using the geometries illustrated in FIGS. 9A, 9B, and 9C and showing gas production improvement with the flow stabilizing device.
FIG. 13 is a graph comparing tube size variation against gas production.

Typically, gas production inside wells is operating in the annular gas-liquid flow regime. The destabilization of the annular flow regime occurs with a decrease in the gas flow rate. FIGS. 10, 11 and 12 show the main results of a comparative CFD case study inside a 4½ inch tubing producing gas with 1% vol condensate. In this example, the two-phase flow annular regime was modeled inside the open tubing (see FIG. 9C), the coiled tubing velocity string (see FIG. 9B) and with the flow stabilizing device mounted on coiled tubing (see FIG. 9A), successively, these geometries having the dimensions reported in the table shown in FIG. 10, with a vertical tubing length of 20 meters. The flow conditions were selected to obtain annular flow regime in each case. However, the average gas velocities are chosen identical in the velocity string and the flow stabilizing device experiments in order to obtain comparative results shown in the table of FIG. 12.

The plots shown in FIGS. 11A, 11B, and 11C show the liquid film thickness. In the velocity string case, shown in FIG. 11B, the flow regime is initially churn-turbulent in the downhole region and then is transitioning to annular.

FIG. 12 displays the calculated averaged produced gas velocities and the corresponding pressure loss coefficients thus providing evidence of the advantage of the present invention over the velocity string technique (see FIG. 9B). In FIG. 12, the discharge coefficient C is defined as the ratio of the actual flow rate to the ideal flow rate, which is calculated as:

$$C = \frac{Q_{actual}}{Q_{ideal}} = Q_{actual} \bigg/ \left( \frac{\pi}{4} D_p^2 \sqrt{\frac{2\Delta P(\Gamma - 1)}{\rho(\Gamma + 1)}} \right) \quad (5)$$

-continued where $\Gamma = \frac{D_p^2}{D_{h_1}^2}$ since $D_t = 0$

The flow stabilizing device extends the gas well operability range by increasing the gas velocity through a minor reduction in the cross-sectional flow area, and operating the well in the stable annular flow regime thereby stabilizing the annular film and preventing film reversal. The gradual restriction of the inverse venturi geometry minimizes pressure drop due to the flow stabilizing device and optimizes the pressure recovery downstream of the flow stabilizing device. A benefit of the flow stabilizing device is the ability to sustain higher flow rates due to the pressure recovery that is achieved with the flow stabilizing device geometry. The gradual restriction of the inverse venturi geometry minimizes pressure drop due to the flow stabilizing device and optimizes the pressure recovery downstream of the flow stabilizing device. The annular area available for flow with the flow stabilizing device, or in combination with the central tube with the HFSD, is prescribed to achieve an annular flow regime and stable liquid film. For example, a 4½ inch tubing well configured with an flow stabilizing device would allow a 400% increase in gas production compared to a coiled tubing velocity string to sustain an equivalent annular flow regime as shown in the example given in FIGS. 9-12.

The method and apparatus of the present invention have been described above and in the attached drawings; however, modifications will be apparent to those of ordinary skill in the art and the scope of protection for the invention is to be defined by the claims that follow.

We claim:

1. A vertical oil and gas production well for conveying a hydrocarbon gas-liquid mixture, comprising:
   a production tubing extending from a bottom of the well to a well head and having upstream and downstream ends and an inner surface:
   a structural support tube disposed entirely within the production tubing and adapted for conduction of a portion of the hydrocarbon gas-liquid mixture to the well head; and
   at least one flow stabilizing device positioned in the production tubing along the structural support tube and dimensioned to accelerate velocity of the hydrocarbon gas-liquid mixture in the production tubing to sustain upward liquid flow,
   wherein the at least one flow stabilizing device includes:
   a first conically-shaped portion facing upstream, wherein a distal end of the first portion forms a first apex that faces upstream;
   a second conically-shaped portion facing downstream, wherein a distal end of the second portion forms a second apex that faces downstream,
   wherein respective outer surfaces of the first and second portions meet at an angle relative to each other and respectively at an angle relative to a central axis through the first and second portion;
   a passageway extending from the first apex through the second apex;
   wherein the at least one flow stabilizing device is dimensioned and configured so that an exterior surface of the flow stabilizing device does not touch an adjacent inner wall of the production tubing, an exterior surface of the first portion forms a solid surface that is configured to partially block and deflect a path of the hydrocarbon gas-liquid mixture so that a first portion of the hydrocarbon gas-liquid mixture flows through the structural support tube and a second portion of the hydrocarbon gas-liquid mixture flows around the flow stabilizing device and along the inner surface of the production tubing up to the well head.

2. The oil and gas production well of claim 1, comprising a plurality of flow stabilizing devices positioned on the structural support tube in a predetermined spaced-apart relation.

3. The oil and gas production well of claim 2, wherein one of the flow stabilizing devices has a configuration that is different than the other or others of the flow stabilizing devices.

4. The oil and gas production well of claim 1, wherein the at least one flow stabilizing device is symmetrical about the central axis extending through the first portion and the second portion.

5. The oil and gas production well of claim 1, wherein an outer diameter Dt of the structural support tube is between:

$0.2 \text{ inch} < D_t < 0.5 \text{ inch}.$

6. The oil and gas production well of claim 1, wherein the structural support tube and the at least one flow stabilizing device are formed as a unitary structure.

7. The oil and gas production tube of claim 1, further comprising a motion actuator attached to an inner surface of the at least one flow stabilizing device for adjusting a diameter of the exterior surface of the flow stabilizing device.

8. The oil and gas production well of claim 1, further comprising at least one opening positioned in a side wall of the flow stabilizing device for passing an injected gas or a liquid down through the structural support tube and out through the at least one opening in order to help stabilize a liquid film at the inner surface of the production tubing.

9. A vertical oil and gas production well according to claim 1, wherein the at least one flow stabilizing device is configured as a converging-diverging dual-cone flow stabilizing device.

10. A flow stabilizing device positioned in a production tubing of an oil and gas well along a structural support tube and dimensioned to accelerate velocity of a hydrocarbon gas-liquid mixture in the production tubing to sustain upward liquid flow, the flow stabilizing device comprising:
   a first conically-shaped portion facing upstream, wherein a distal end of the first portion forms a first apex that faces upstream;
   a second conically-shaped portion facing downstream, wherein a distal end of the second portion form a second apex that faces downstream
   wherein respective outer surfaces of the first and second portions meet at an angle relative to each other and respectively at an angle relative to a longitudinal axis of the flow stabilizing device;
   a passageway extending from the first apex through the second apex;
   wherein the structural support tube is attached directly to the second apex extending axially from the second apex therethrough through the passageway and through and is disposed entirely within the production tubing said structural support tube adapted for conduction of a portion of the hydrocarbon gas-liquid mixture to the well head, and
   wherein the flow stabilizing device is dimensioned and configured so that an exterior surface of the flow stabilizing device does not touch an adjacent inner wall of the production tubing, an exterior surface of the first portion forms a solid surface that is configured to partially block and deflect a path of the hydrocarbon gas-liquid mixture so that a first portion of the hydrocarbon gas-liquid mixture flows through the structural support tube and a second portion of the flowing hydrocarbon gas-liquid mixture flows around the flow stabilizing device and along the inner surface of the production tubing up to a well head.

11. The flow stabilizing device of claim 10, wherein a flow stabilizing device diameter ratio A is in a range from 0 to ⅔:

Where $\Delta = D_t / D_{h_2}$ wherein $D_t$ is outer diameter of the structural support tube (10) $D_{h_2}$, is diameter of intersection between the first and second portions (21, 23), whereby the flow stabilizing device generates a desired blockage to a flow section area in the vertical column.

12. A flow stabilizing device according to claim 10, wherein the flow stabilizing device is configured as a converging-diverging dual-cone flow stabilizing device.

13. A method of accelerating velocity of a hydrocarbon gas-liquid flow in a vertical production tubing of an oil and gas well, the production tubing having an inner surface, the method comprising the steps of:
    positioning at least one flow stabilizing device centrally in the production tubing along a structural support tube disposed entirely within the production tubing, the at least one flow stabilizing device having a first conically-shaped portion facing upstream, wherein the distal end of the first portion forms a first apex that faces upstream, said structural support tube adapted for conduction of a portion of the hydrocarbon gas-liquid mixture to a well head of the production tubing;
    a second conically-shaped portion facing downstream, and wherein the distal end of the second portion forms a second apex that faces downstream, the structural support tube being attached to the second apex, extending axially therethrough,
    wherein respective outer surfaces of the first and second portions meet at an angle relative to each other and respectively at an angle relative to a longitudinal axis of the flow stabilizing device;
    a passageway extending from the first apex through the second apex, and
    wherein the at least one flow stabilizing device is dimensioned and configured so that an exterior surface of the flow stabilizing device does not touch an adjacent inner wall of the production tubing, an exterior surface of the first portion forms a solid surface that is configured to partially block and deflect a path of a flowing hydrocarbon gas-liquid mixture so that a first portion of the hydrocarbon gas-liquid mixture flows through the structural support tube and a second portion of the flowing hydrocarbon gas-liquid mixture flows around the flow stabilizing device along the inner surface of the production tubing up to the well head.

14. The method of claim 13, comprising the step of varying a momentum transfer by adjusting a flow acceleration ratio Γ at the flow stabilizing device throat:
where $$\Gamma = \frac{D_p^2}{D_{h_1}^2 - D_t^2}$$

wherein:
$D_p$ is inner diameter of the production tubing
$D_{h_1}$ is diameter of intersection between the first portion (21) and the second portion (23) of the flow stabilizing device, and
$D_t$ is inner diameter of the structural support tube (10), and
    wherein the flow acceleration ratio is adjusted by varying the diameter of the intersection (Dh1) between the first and second portions,
    whereby the fluid flow near walls of the production tubing (40) is stabilized and a gas flow velocity in the structural support tube (10) is increased.

15. The method of claim 14, wherein the flow acceleration ratio Γ is in a range 1.2 ≤ Γ ≤ 5.

16. A flow stabilizing device positioned in a production tubing of an oil and gas well along a structural support tube to accelerate velocity of a flowing gas-liquid mixture and to sustain upward liquid flow, the stabilizing device comprising:
    a first conically-shaped portion extending upward and a distal end of which forms a first apex facing upstream;
    a second-conically-shaped portion extending downward and a distal end of which forms a second apex facing downstream; and
    a passageway extending from the first apex to a second apex,
    wherein respective outer surfaces of the first conically-shaped portion and the second conically-shaped portion meet at an angle relative to each other and respectively at an angle relative to a longitudinal axis of the flow stabilizing device, and
    wherein an exterior surface of the flow stabilizing device, when mounted in the production tubing, does not touch an adjacent inner wall of the production tubing, an exterior surface of the first portion forms a solid surface that is configured to partially block and deflect a path of the hydrocarbon gas-liquid mixture so that a first portion of the hydrocarbon gas-liquid mixture flows through the structural support tube and a second portion of the flowing hydrocarbon gas-liquid mixture flows around the flow stabilizing device and along the inner surface of the production tubing up to the well head.

\* \* \* \* \*